United States Patent
Katayama et al.

(10) Patent No.: US 10,049,600 B2
(45) Date of Patent: Aug. 14, 2018

(54) SUTURE TECHNIQUE EVALUATION APPARATUS, RECORDING MEDIUM STORING PROGRAM FOR SUTURE TECHNIQUE EVALUATION APPARATUS, AND SUTURE SIMULATOR SYSTEM

(71) Applicants: KYOTO KAGAKU CO., LTD., Kyoto-shi, Kyoto (JP); KYUSHU UNIVERSITY, NATIONAL UNIVERSITY CORPORATION, Fukuoka-shi, Fukuoka (JP)

(72) Inventors: Tamotsu Katayama, Otsu (JP); Noriyuki Matsuoka, Kyoto (JP); Munenori Uemura, Fukuoka (JP); Makoto Hashizume, Fukuoka (JP); Takahiro Jimbo, Ibaraki (JP); Satoshi Obata, Fukuoka (JP); Satoshi Ieiri, Kagoshima (JP); Tomoaki Taguchi, Fukuoka (JP)

(73) Assignees: KYOTO KAGAKU CO., LTD., Kyoto-shi, Kyoto (JP); KYUSHU UNIVERSITY, NATIONAL UNIVERSITY CORPORATION, Fukuoka-shi, Fukuoka (JP)

( * ) Notice: Subject to any disclaimer, the term of this patent is extended or adjusted under 35 U.S.C. 154(b) by 141 days.

(21) Appl. No.: 14/743,884

(22) Filed: Jun. 18, 2015

(65) Prior Publication Data
US 2015/0371558 A1    Dec. 24, 2015

(30) Foreign Application Priority Data
Jun. 19, 2014  (JP) .................................. 2014-126006

(51) Int. Cl.
G09B 23/30 (2006.01)
G09B 23/34 (2006.01)
G09B 23/28 (2006.01)

(52) U.S. Cl.
CPC ............ *G09B 23/285* (2013.01); *G09B 23/28* (2013.01)

(58) Field of Classification Search
CPC ........ G09B 23/28; G09B 23/30; G09B 23/32; G09B 23/34; G09B 23/285
(Continued)

(56) References Cited

U.S. PATENT DOCUMENTS

2005/0214727 A1* 9/2005 Stoianovici ............ G09B 23/28
  434/262
2010/0009329 A1 1/2010 Takanishi et al.
(Continued)

FOREIGN PATENT DOCUMENTS

JP   2008129020 A   6/2008
WO   2008041456 A1  4/2008
(Continued)

OTHER PUBLICATIONS

Jacob Rosen, Blake Hannaford, Christina G. Richards, and Mika N. Sinanan; Markov Modeling of Minimally Invasive Surgery Based on Tool/ Tissue Interaction and Force/ Torque Signatures for Evaluating Surgical Skills; May 2001; IEEE Transactions on Biomedical Engineering, vol. 48, No. 5.*
(Continued)

*Primary Examiner* — Robert J Utama
*Assistant Examiner* — Lily M Del Valle
(74) *Attorney, Agent, or Firm* — Alleman Hall Creasman & Tuttle LLP

(57) ABSTRACT

A suture technique evaluation apparatus evaluates a suture technique performed on a simulated body simulating a part
(Continued)

of the human body, and the suture technique evaluation apparatus includes a camera configured to image at least a suture region where suturing is performed on the simulated body, and a ligation force evaluation part adapted to evaluate the ligation force of the suturing on the basis of image data taken by the camera.

9 Claims, 15 Drawing Sheets

(58) Field of Classification Search
USPC .......................................................... 434/272
See application file for complete search history.

(56) References Cited

U.S. PATENT DOCUMENTS

| | | | |
|---|---|---|---|
| 2014/0100517 A1* | 4/2014 | Tran ..................... | A61M 16/109 604/26 |
| 2015/0086955 A1* | 3/2015 | Poniatowski .......... | G09B 23/28 434/267 |
| 2015/0187229 A1* | 7/2015 | Wachli ................. | G09B 23/285 434/272 |
| 2016/0314713 A1* | 10/2016 | Ando ....................... | G09B 5/02 |

FOREIGN PATENT DOCUMENTS

| | | |
|---|---|---|
| WO | 2013165529 A2 | 11/2013 |
| WO | 2014052868 A1 | 4/2014 |

OTHER PUBLICATIONS

Kyoto Kagaku Co., Ltd., "Educational Unit for Saturing Surgery Technique," Brochure Distributed at the 45th Annual Meeting of the JSME, Jul. 2013, 7 pages. (See p. 1, English summary of Brochure).

Uemura, M., "Laparoscopic Intestinal Tract Suture Simulator Evaluation System," Kyushu University Center for Advanced Medical Innovation, Jan. 2014, 12 pages.

Kyoto Kagaku Co., Ltd., "Technical Workshop—Challenge to Sensor Technology—Can Sensors Verify Trainee's Skill?," Jan. 2014, Distributed at SAGES Apr. 2014, 11 pages.

Japan Patent Office, Office Action Issued in Japanese Application No. 2014-126006, dated Nov. 30, 2017, 6 pages. (Submitted with English Translation of Office Action).

\* cited by examiner

SUTURE TECHNIQUE EVALUATION APPARATUS, RECORDING MEDIUM STORING PROGRAM FOR SUTURE TECHNIQUE EVALUATION APPARATUS, AND SUTURE SIMULATOR SYSTEM

TECHNICAL FIELD

The present invention intends to evaluate a suture result of suture technique training or the like.

BACKGROUND ART

As training for a suture technique, suturing is performed on a simulated body simulating, for example, human tissue using a forceps or a needle holder (see Patent Literature 1).

Meanwhile, even in the case where an opening part of a simulated body appears to be neatly sutured by a non-expert's suture technique, the suture technique may not reach a level required for actual surgery because sufficient ligation force may not be obtained.

On the other hand, suturing by an expert is adjusted such that not only the appearance is neat, but a suture part is subtly drawn to bring out necessary and sufficient ligation force.

However, it is difficult for a non-expert to grasp the difference between suturing by the non-expert himself/herself and suturing by the expert as a sense, and therefore a training effect on a suture technique may be less likely to be exerted.

CITATION LIST

Patent Literature

Patent Literature 1: JP-A-2008-129020

SUMMARY OF INVENTION

Technical Problem

The present invention is made in consideration of the problem as described above, and an object thereof is to provide a suture technique evaluation apparatus, a suture technique evaluation apparatus program, and a suture simulator system, which make it possible to automatically objectively evaluate the ligation force by suturing for example and to significantly improve a training effect on a suture technique.

Solution to Problem

That is, the suture technique evaluation apparatus is a suture technique evaluation apparatus that evaluates a suture technique performed on a simulated body simulating a part of a human body, and includes: a camera configured to image at least a suture region where suturing is performed on the simulated body; and a suture evaluation mechanism adapted to evaluation a sutural state performed on the simulated body on a basis of image data taken by the camera.

If so, the suture technique evaluation apparatus includes the suture evaluation mechanism adapted to evaluation the sutural state performed on the simulated body on the basis of image data taken by the camera, and therefore right and wrong of the sutural state that is difficult for a non-expert to know can be automatically objectively evaluated on the basis of the image data.

Accordingly, by repeating training with reference to the evaluation by the suture evaluation mechanism, even the non-expert can know an ideal suture state and thereby a training effect can be increased.

In order to make the non-expert easily know the ideal suture state that the ligation force would be brought out necessary and sufficient, the suture evaluation mechanism may include a ligation force evaluation part adapted to evaluate ligation force of the suturing on a basis of image data taken by the camera.

In order to make it possible to automatically evaluate the ligation force with accuracy from the image data with a simple configuration apparatus, the ligation force evaluation part may include: a suture region extraction part adapted to extract the suture region from the image data; and a ligation force calculation part adapted to calculate a value related to the ligation force on the basis of an area of the suture region extracted by the suture region extraction part and a predetermined reference area. For example, by setting the reference area based on areas of suture regions resulting from experts' suturing, it can be quantitatively evaluated how the ligation force based on suturing by a trainee is close to the ligation force by an expert and the like.

As a specific configuration example to make it easy to extract the area of the suture region from the image data and make it possible to accurately evaluate the ligation force on the basis of the image data, the simulated body may be formed in a sheet shape, and include a suturing target opening to be sutured, and a surrounding region of the suturing target opening and an outside region on the outer side of the surrounding region are respectively colored in different colors; and the suture region extraction part may be configured to extract the surrounding region as the suture region on the basis of the difference in color or brightness between the surrounding region and the outside region in the image data. If so, a boundary between the surrounding region and the outside region is easily extracted from the difference in brightness in the image data. Therefore the area of the suture region can be accurately calculated to increase evaluation accuracy of the ligation force.

For example, even though the suturing target opening of the simulated body appears to be fully closed by suturing, in the case where gas, liquid, or the like passes through the suturing target opening to give rise to at least a predetermined amount of leakage, the non-expert's suture technique is not reached a level required for actual surgery. In order to make it possible to quantitatively evaluate how large such a leakage amount caused by the suturing is, and also make it possible for a non-expert to learn an appropriate suture state through training, the suture technique evaluation apparatus further may include: a pressurizing mechanism adapted to pressurize at least the suture region of the simulated body with gas; a pressure sensor adapted to measure a pressure of the gas inside the pressurizing mechanism or a pressure of the gas passing through the suture region; and a leak pressure evaluation part adapted to evaluate a value related to a leak pressure from the suture region on the basis of the pressure measured with the pressure sensor. If so, the leakage can be evaluated on the basis of the pressure of the gas, and therefore the leakage that is difficult to visually know can be accurately and quantitatively evaluated. This enables to further increase the training effect.

Specific configuration examples to accurately evaluate the leakage from the suture region of the simulated body with a simple configuration may include one where the pressurizing mechanism includes a pressurizing source, and a pressurizing chamber that is communicatively connected to the pressurizing source and has an attachment port to be attached with the simulated body; and the pressure sensor is provided so as to measure a pressure inside the pressurizing chamber.

In order to make it possible to evaluate the leakage and evaluate the ligation force at once with the same apparatus, a part of a partition wall forming the pressurizing chamber may be formed of a transparent wall; and the camera may be configured to image the suture region of the simulated body that is attached on the attachment port through the transparent wall from outside the pressurizing chamber.

In order to make it possible to evaluate whether or not a suture result is allowable from the perspective of comprehensive evaluation on the basis of particularly important parameters among parameters to evaluate suturing, the suture technique evaluation apparatus further may include: an all layer suture evaluation part adapted to evaluate whether or not a suture thread penetrates through all layers; and a comprehensive evaluation part adapted to output a comprehensive evaluation result of the suture technique on the basis of at least a result of the evaluation by the leak pressure evaluation part and a result of the evaluation by the all layer suture evaluation part.

In order to make it possible to make the comprehensive evaluation on the basis of requirements from the functional perspective of suturing while making it possible to further evaluate the suturing from various angles together with reference information as well, the suture technique evaluation apparatus further may include: an opening area evaluation part adapted to evaluate an opening area in the suture region of the simulated body on the basis of the image data; and a suture time evaluation part adapted to evaluate a time required for the suturing, and the comprehensive evaluation part is configured to determine whether or not the suture technique meets a predetermined standard.

In order to make the non-expert to learn a technique of laparoscopic nissen fundoplication easily, the simulated body may simulate a diaphragm and a stomach, and the suture evaluation mechanism may comprise: nissen fundoplication evaluation part adapted to evaluate at least a size of hiatus in the simulated body on the basis of the image data.

In order to make it possible to evaluate a suture state immediately after suture training to further increase the training effect, it is only necessary to use a suture simulator system including: the suture technique evaluation apparatus; and a suture simulator that can simulate a suture technique.

For example, in order to add an evaluation function for ligation force to an existing suture technique evaluation apparatus, it is only necessary to use a suture technique evaluation apparatus program that is a program used for a suture technique evaluation apparatus, which includes a camera configured to image at least a suture region where suturing is performed on a simulated body simulating a part of a human body and is adapted to evaluate a suture technique performed on the simulated body, and instructs a computer to fulfil a function as a ligation force evaluation part adapted to evaluate ligation force based on suturing on the basis of image data taken by the camera.

Advantageous Effects of Invention

As described above, the suture technique evaluation apparatus of the present invention is configured to evaluate the state of the suturing on the basis of the image data taken by the camera, and can therefore accurately evaluate the state of the suturing as well as automating the evaluation to increase a training effect on a non-expert.

DESCRIPTION OF EMBODIMENTS

Figure 1:
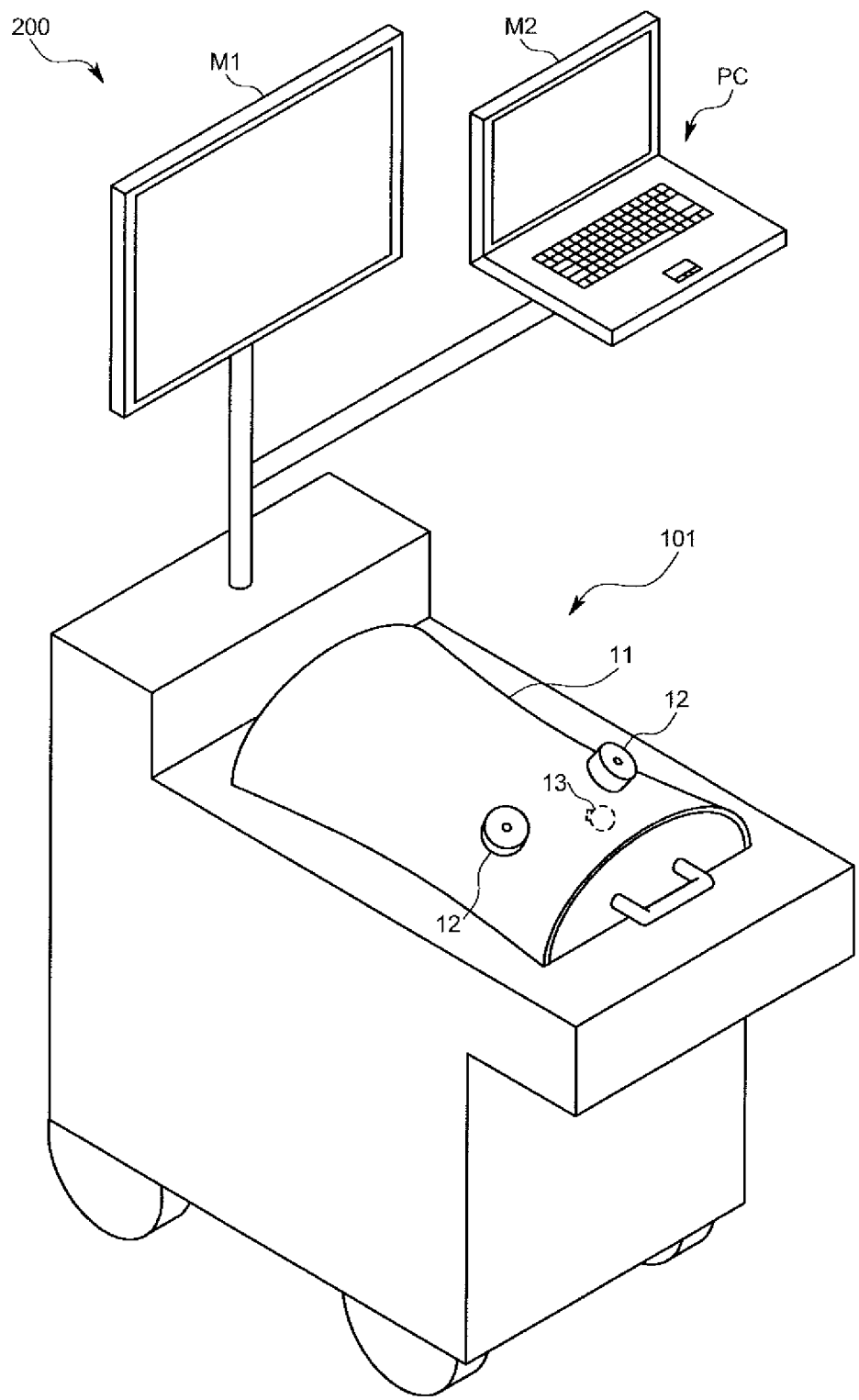
FIG. 1 is a schematic perspective view illustrating the appearance of a suture simulator system according to one embodiment of the present invention.

A suture simulator system 200 according to one embodiment of the present invention is described with reference to FIGS. 1 to 9.

The suture simulator system 200 of the present embodiment is one intended to do training for suturing an intestinal canal by endoscopic surgery. More specifically, as illustrated in FIGS. 1 and 2, the suture simulator system 200 is configured to include: a suture simulator 101 intended to imitate substantially the same state as that of actual endoscopic surgery, and simulate a suture technique performed on a simulated body W simulating a part of the human body; and a suture technique evaluation apparatus 100 used to evaluate a result of suturing the simulated body W using the suture simulator 101.

First, the suture simulator 101 is described with reference to FIGS. 1 to 6. As illustrated in FIGS. 1 and 2, the suture simulator 101 includes: a simulated torso 11 that simulates the chest and abdomen of the human body; a placing stage 14 which is contained inside the simulated torso 11 and on which the simulated body W is placed; a technique imaging camera 13 that is provided inside the simulated torso 11 to image the periphery of the placing stage 14; and a first monitor M1 on which a moving image taken by the technique imaging camera 13 is displayed. The suture simulator 101 is adapted such that a person who does suture training can directly face to the first monitor M1 in a state of standing on the lower half side of the simulated torso 11, and a notebook computer PC adapted to provide input or the like to the below-described suture technique evaluation apparatus 100 is provided on the right hand side of the first monitor M1.

Figure 2:
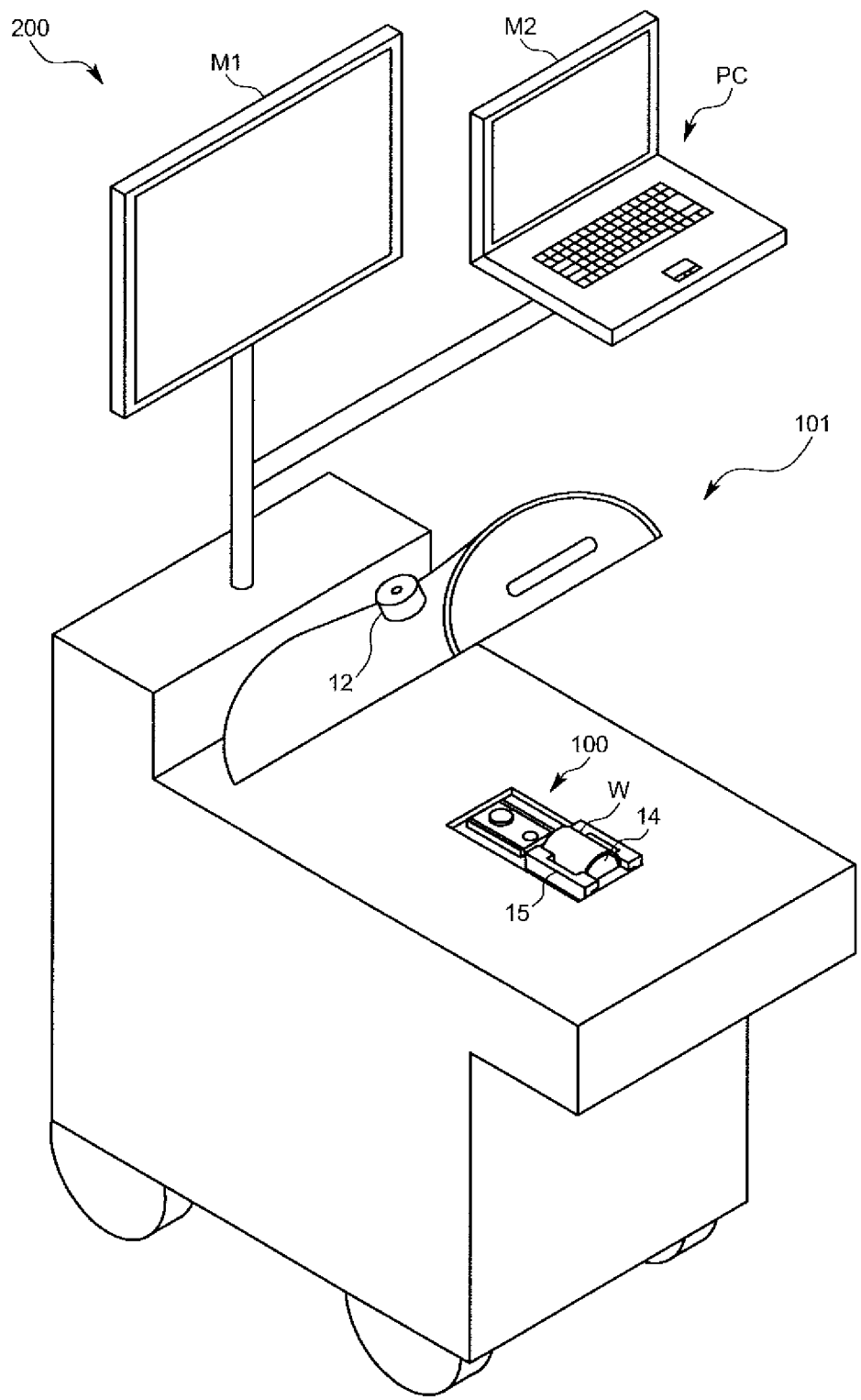
FIG. 2 is a schematic perspective view illustrating an internal mechanism of the suture simulator system in the same embodiment.
Figure 3:
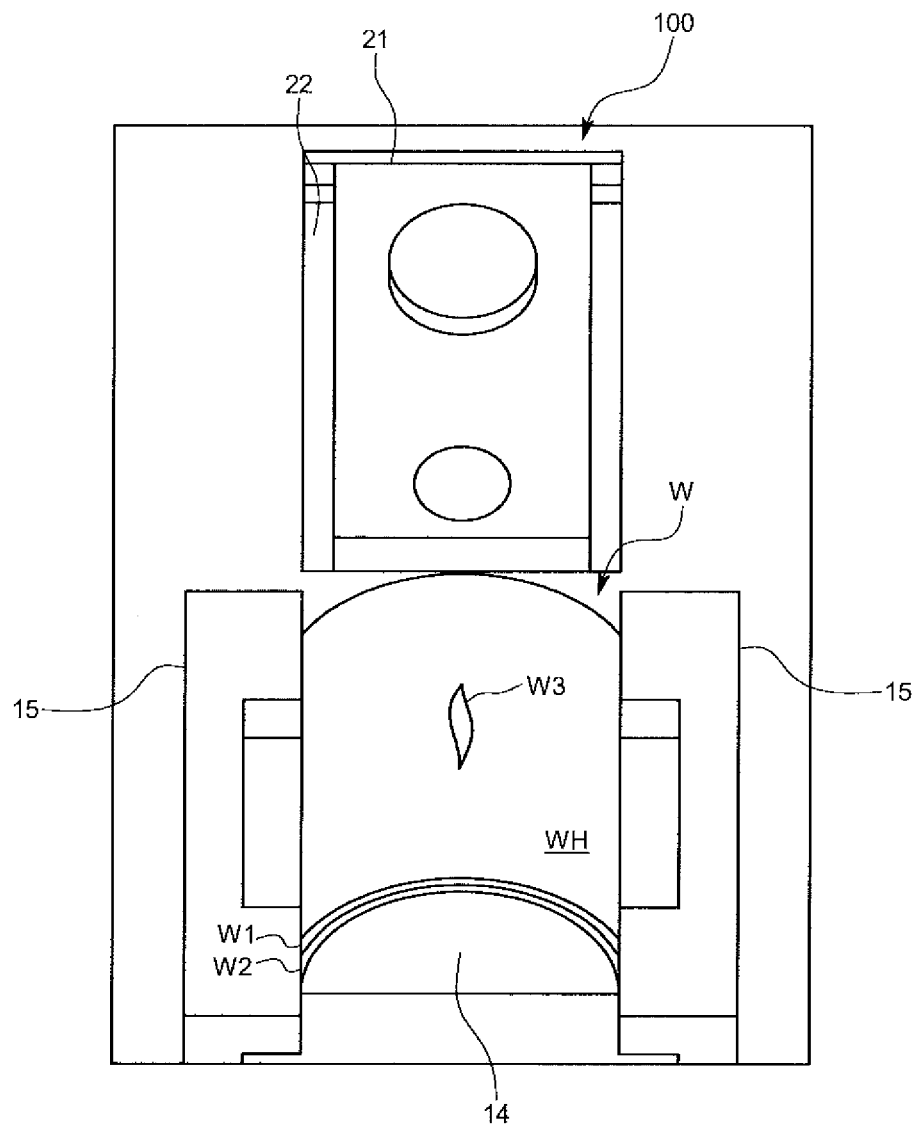
FIG. 3 is a schematic perspective view illustrating a usage state of a suture simulator displayed on a first monitor in the same embodiment.

In the case of doing the suture training, as illustrated in FIG. 1, the suture simulator 101 is adapted to, in a state where the simulated torso 11 is not raised but placed on the base, be able to insert forceps for endoscopic surgery from two forceps insertion parts 12 provided on the outer side of the simulated torso 11 into the simulated torso 11. Further, the suture simulator 101 is configured to be able to operate the forceps to suture a suturing target opening W3 of the simulated body W while seeing an image including the simulated body W on the placing stage 14 and the forceps, which is taken by the technique imaging camera 13 and displayed on the first monitor M1 as illustrated in FIG. 3.

Figure 4:
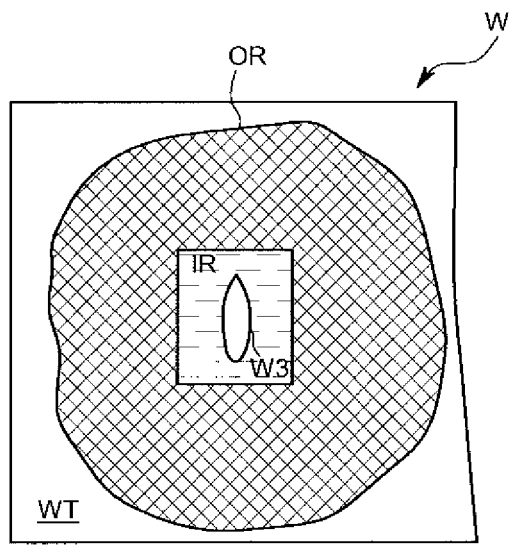
FIG. 4(a) is a schematic diagram illustrating the configuration of a simulated body in the same embodiment.
FIG. 4(b) is a schematic diagram illustrating the configuration of a simulated body in the same embodiment.
Figure 4:
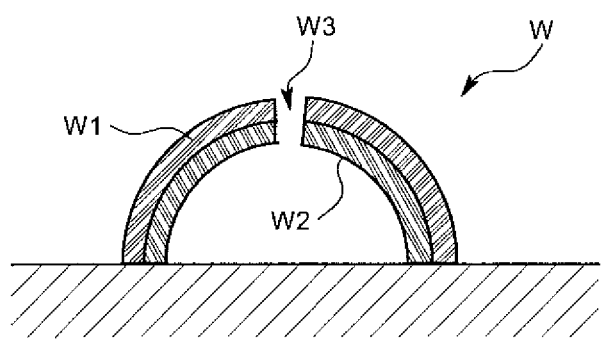

The simulated body W is one that simulates an intestinal canal; however, as illustrated in FIG. 4(*a*) and FIG. 4(*b*), the simulated body W is not formed in a cylindrical shape, but formed in a sheet shape. By placing the sheet-shaped simulated body W on the placing stage 14 to fix the simulated body W with a fixing mechanism 15, a cylindrical shape of an intestinal canal in the abdominal cavity as illustrated in FIGS. 3 and 4(*b*) is imitated. More specifically, the placing stage 14 is configured such that both end parts thereof are formed in a semi-cylindrical shape, and a concave part is formed in the central part. For this reason, by arranging the sheet-shaped simulated body W so as to place the central part of the simulated body W on the concave part, suturing can be performed with the shape of an intestinal canal being simulated. The simulated body W is made of elastic resin, and as illustrated in FIG. 4(*b*), has a structure including at least two layers so as to simulate the serosal layer W1 and mucosal layer W2 of an intestinal canal. Between the serosal layer W1 and mucosal layer W2 of the simulated body W, gauze made of nylon is crimped, and further changing elasticity between the serosal layer W1 and the mucosal layer W2 enables a realistic suture technique to be imitated.

Still further, on the back surface WT side of the simulated body W, in order to make it possible to more accurately make evaluations in the below-described suture technique evaluation apparatus 100, a surrounding region IR of the suturing target opening W3 to be sutured and an outside region OR on the outer side of the surrounding region IR are respectively colored in different colors as illustrated in FIG. 4(*a*).

Figure 5:
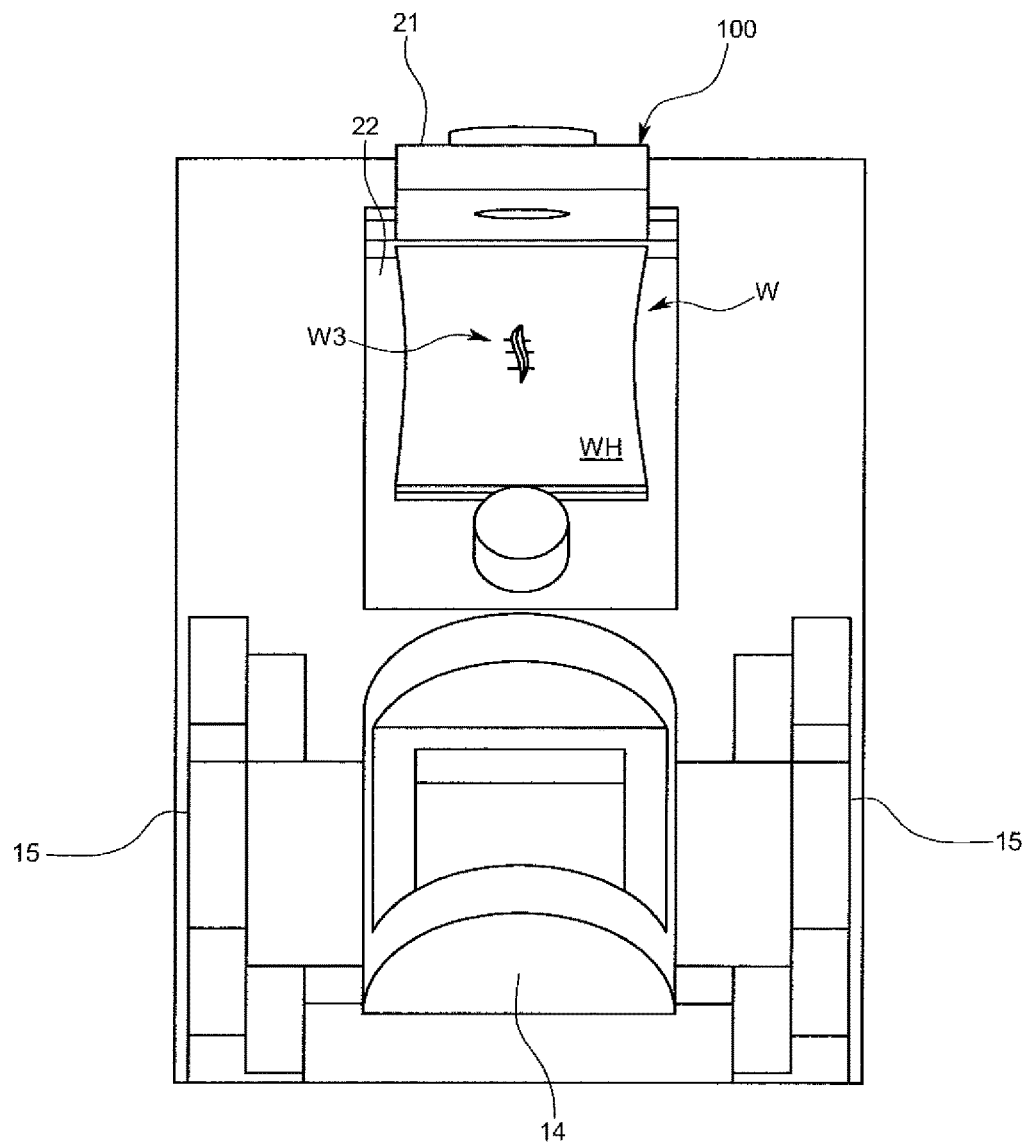
FIG. 5 is a schematic perspective view illustrating another usage state of the suture simulator displayed on the first monitor in the same embodiment.
Figure 6:
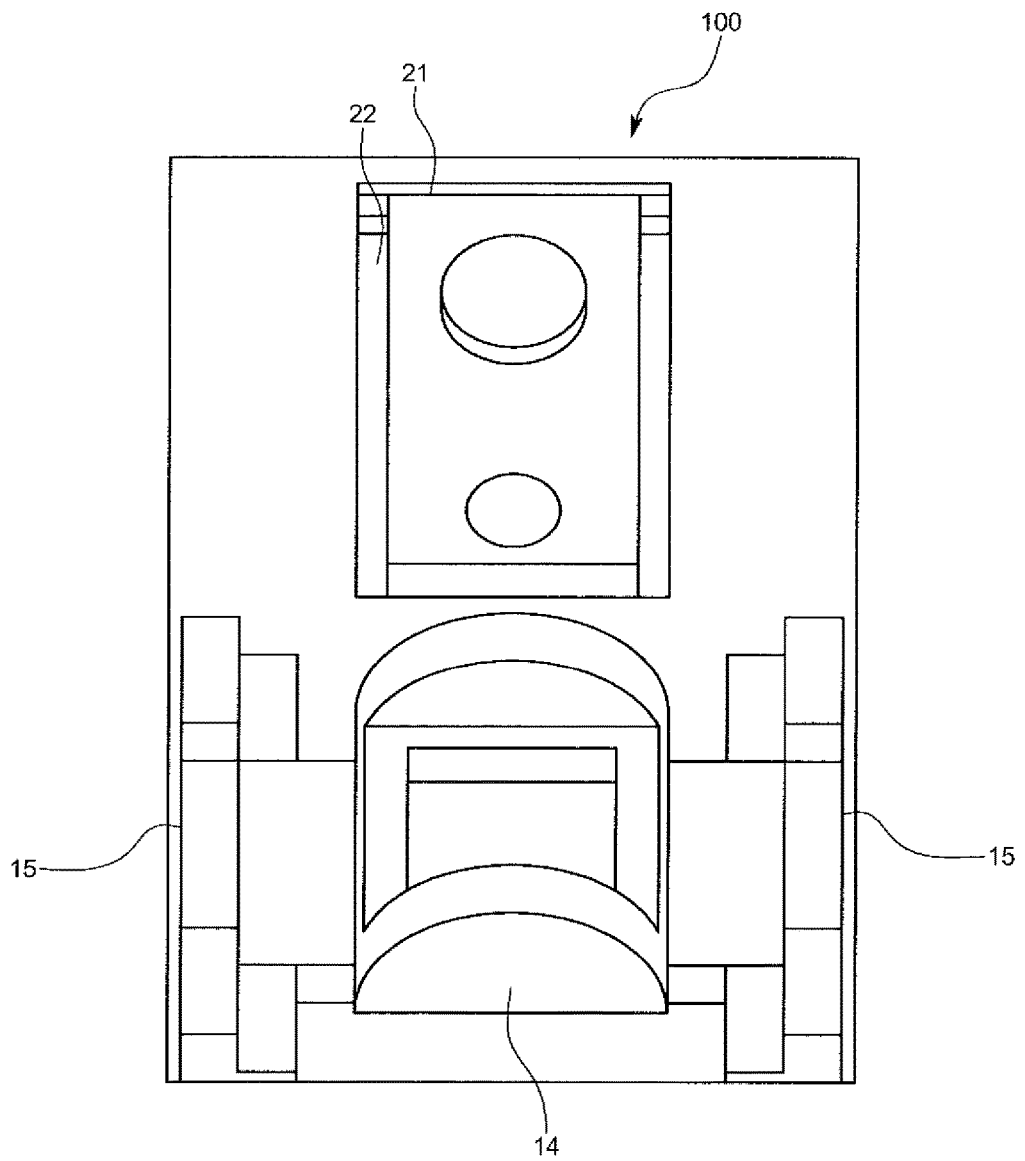
FIG. 6 is a schematic perspective view illustrating a usage state of a suture evaluation apparatus displayed on the first monitor in the same embodiment.

Next, the configuration of the suture technique evaluation apparatus 100 adapted to evaluate a suture result in the suture simulator 101 is described. The suture technique evaluation apparatus 100 is provided adjacent to the placing stage 14, and is one that, after raising the simulated torso 11 as illustrated in FIG. 2, then moving the sutured simulated body W from the placing stage 14 as illustrated in FIG. 5, and closing a lid body 21 as illustrated in FIG. 6, makes evaluations of various types of suture states in a state where the simulated body W is fixed with the surface WH of the simulated body W facing outward.

Figure 7:
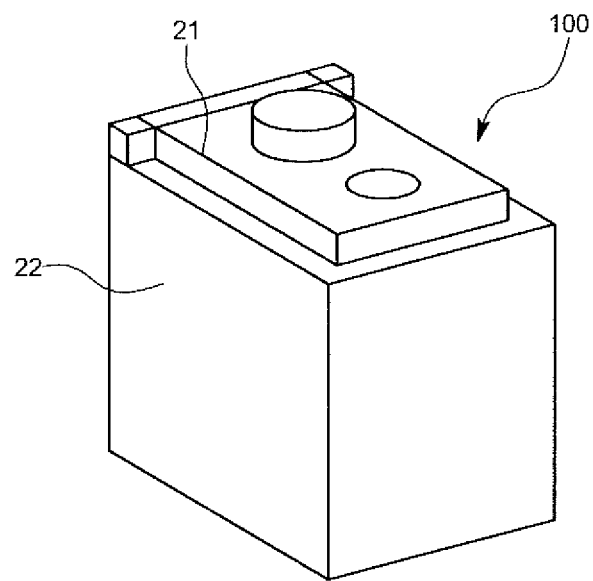
FIG. 7(a) is a schematic diagram illustrating the structure of the suture evaluation apparatus in the same embodiment.
FIG. 7(b) is a schematic diagram illustrating the structure of the suture evaluation apparatus in the same embodiment.
Figure 7:
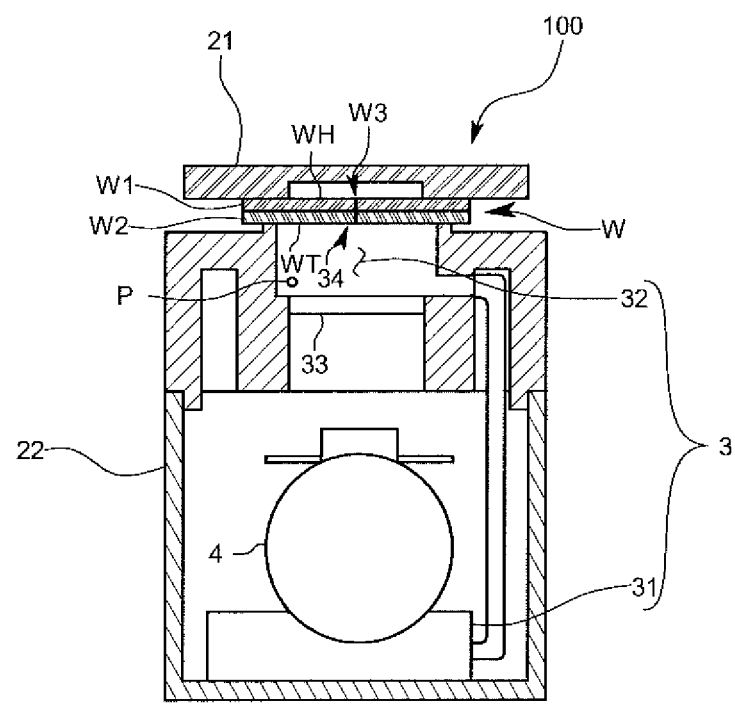

As illustrated in FIG. 7(*a*), the suture technique evaluation apparatus 100 is one having a substantially rectangular-parallelepiped housing 22 that has the lid body 21 on the upper surface, adapted to fix the simulated body W, and inside the suture technique evaluation apparatus 100, a pressurizing mechanism 3 adapted to apply pressure to a suture region of the fixed simulated body W, a suture evaluation camera 4 adapted to image the suture region of the attached simulated body W, and a control mechanism 5 adapted to control the pressurizing mechanism 3 and other sensors are provided.

As illustrated in FIG. 7(*b*), the pressurizing mechanism 3 includes: a pressurizing source 31 that is contained in the lower part inside the housing 22; and a pressurizing chamber 32 that is provided in the upper part of the housing 22, is communicatively connected to the pressurizing source 31, and has an attachment port 34 to be attached with the simulated body W. The inside of the pressurizing chamber 32 is adapted to form into a closed space by fixing the simulated body W on the attachment port 34 with the lid body 21.

A partition wall on the bottom surface side of the pressurizing chamber 32 is a transparent wall 33, and the attachment port 34, the transparent wall 33, and a lens part of the suture evaluation camera 4 are aligned in line to make it possible to image the back surface WT side of the simulated body W attached on the attachment port 34 with the suture evaluation camera 4. In addition, in the present embodiment, a pressure sensor P adapted to measure a pressure inside the pressurizing chamber 32 is also provided.

Figure 8:
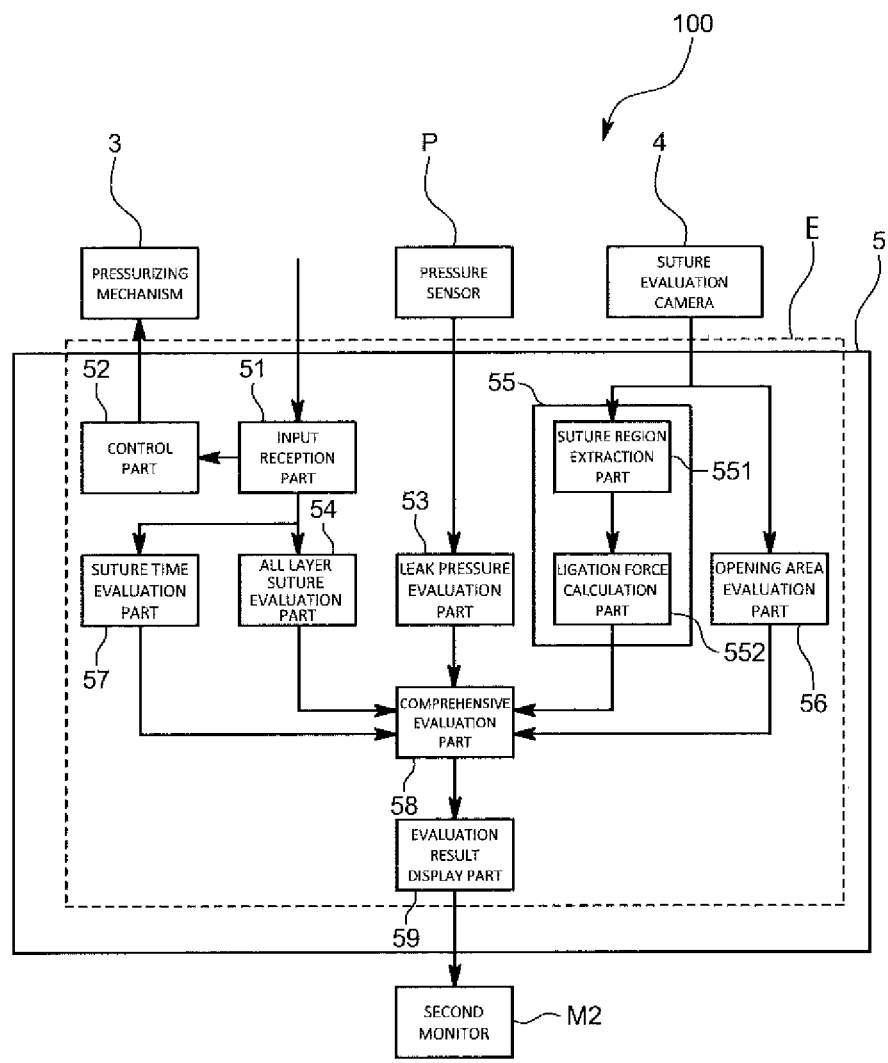
FIG. 8 is a schematic functional block diagram illustrating the configuration of the suture simulator system in the same embodiment.
Figure 9:
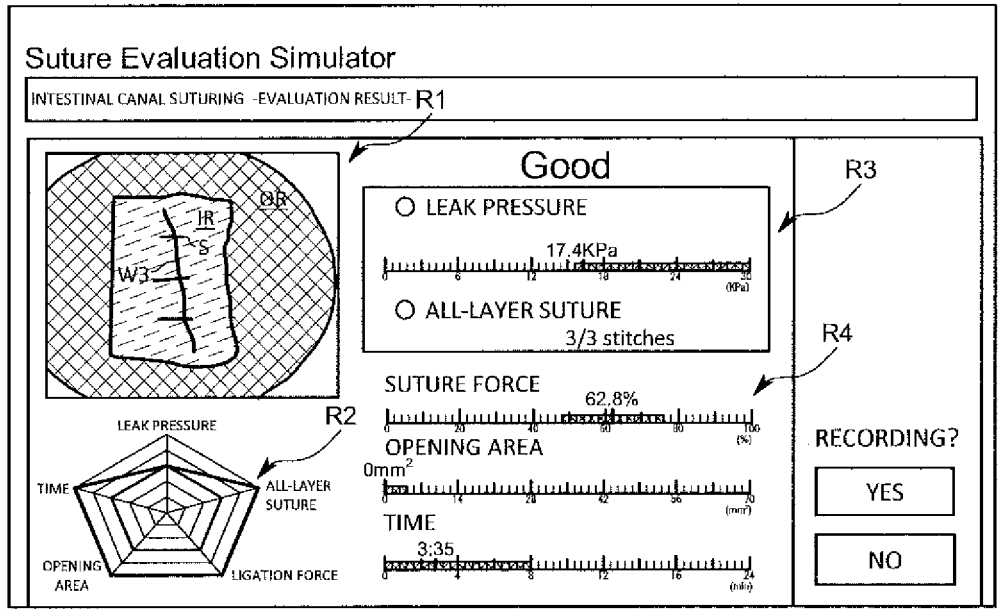
FIG. 9(a) is a schematic diagram illustrating examples of a suture evaluation result displayed on a second monitor in the same embodiment.
FIG. 9(b) is a schematic diagram illustrating examples of a suture evaluation result displayed on a second monitor in the same embodiment.
Figure 9:
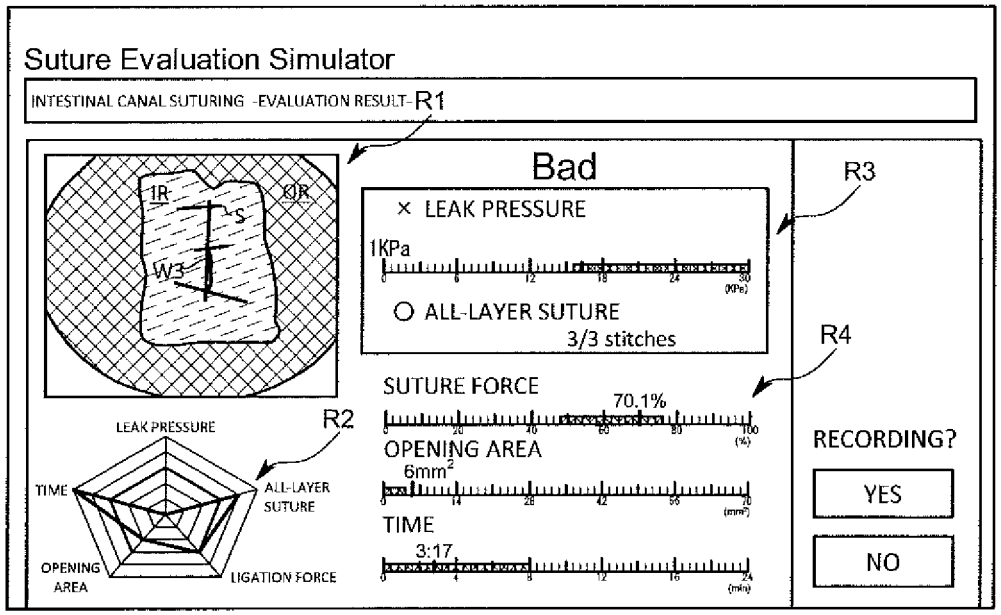

The control mechanism 5 is one that includes a CPU, a memory, A/D and D/A converters, and various types of input/output devices, and as illustrated in a functional block diagram of FIG. 8, configured to fulfill at least functions as an input reception part 51, a control part 52, a leak pressure evaluation part 53, an all layer suture evaluation part 54, a ligation force evaluation part 55, an opening area evaluation part 56, a suture time evaluation part 57, a comprehensive evaluation part 58, an evaluation result display part 59 by executing a suture technique evaluation program stored in the memory to cooperate with the notebook computer PC or the like. Further, the suture technique evaluation apparatus 100 is configured to evaluate a suture technique of a trainee by in mutual cooperation with these parts, performing various types of measurement of the suture technique on the simulated body W to compare results of the measurement with measurement results obtained by a suture technique of an expert. In addition, a suture evaluation mechanism E is configured by these parts 51~59.

The respective parts are described.

The input reception part 51 is one that receives input from a user through the notebook computer PC or the like. In the present embodiment, the input reception part 51 is one that receives a suture evaluation start input instruction from the user and the input of the number of successful all-layer sutures.

The control part 52 is one adapted to control the pressurizing mechanism 3, and configured to start to pressurize the inside of the pressurizing chamber 32 upon receipt of the start input instruction.

The leak pressure evaluation part 53 is configured to evaluate the leakage of air from the suturing target opening W3 of the simulated body W, and evaluate and visualize suture performance that is difficult to evaluate only from appearance. That is, even in the case where the suturing target opening W3 appears to be closed by suturing, applying pressure may form a gap to cause the leakage from inside. The leak pressure evaluation part 53 evaluates whether or not the suturing is performed to such an extent as to prevent such a problem.

More specifically, the leak pressure evaluation part 53 is one that, in the case of applying pressure with the sutured simulated body W that is attached on the attachment port 34 of the pressurizing chamber 32, evaluates a leak pressure on the basis of a pressure value measured with the pressure sensor P. In the present embodiment, the evaluation is made not by measuring the pressure itself of gas leaking through the simulated body W but by measuring the pressure inside the pressurizing chamber 32, which has a value related to the leak pressure. The leak pressure evaluation part 53 evaluates whether or not, a pressure measured with the pressure sensor P is within an allowable range and sufficient suturing is accomplished with reference to a pressure inside the pressurizing chamber 32 in the case where an expert sutures the simulated body W.

The all layer suture evaluation part 54 compares the number of all-layer sutures self-reported by a user, which is received by the input reception part 51, and the number of stitches actually made to evaluate whether or not sufficient suturing is accomplished. Note that the all-layer suture refers to a state where suturing is performed such that a suture thread S penetrates through the all the layers of the simulated body W from the front surface WH to the back surface WT. In the present embodiment, the user counts the number of suture threads S displayed in an image taken by the suture evaluation camera 4 as illustrated in FIG. 9(a) and FIG. 9(b), and the count inputted to the input reception part 51 is used for the evaluation. Note that the all layer suture evaluation part 54 may be configured to automatically sense the number of suture threads S achieving the all-layer suture using image processing, and thereby make the evaluation.

The ligation force evaluation part 55 is one that as illustrated in FIG. 8, evaluates suturing-based ligation force on the basis of image data on the back surface WT of the simulated body W taken by the suture evaluation camera 4. Note that the ligation force indicates the strength to suture the suturing target opening W3, and serves as an indicator for evaluating whether or not the sutured opening W3 is again opened, and the like even in the case of applying force to the suturing target opening W3.

More specifically, the ligation force evaluation part 55 includes: a suture region extraction part 551 adapted to extract the suture region from the image data; and a ligation force calculation part 552 adapted to calculate a value related to the ligation force on the basis of an area of the suture region extracted by the suture region extraction part 551 and a predetermined reference area.

The suture region extraction part 551 detects the boundary between the surrounding region IR and outside region OR of the simulated body W in the image data taken by the suture evaluation camera 4, on the basis of the difference in color or brightness between the surrounding region IR and the outside region OR as illustrated in FIG. 9(a) and FIG. 9(b).

Further, the suture region extraction part 551 is configured to extract the surrounding region IR as the suture region on the basis of the detected boundary. That is, the suture region in the present embodiment can also be considered as the surrounding region IR in the image data imaged in a suturing-based contraction state.

The ligation force calculation part 552 is one that calculates a ratio of an area of the suture region contracted in the image data to the reference area as the value related to the ligation force. That is, in the case of performing suturing so as to moderately bring out ligation force, the simulated body W is contracted to some extent, and therefore the ligation force can be determined on the basis of a contraction state based on suturing by an expert. Note that the present invention may be adapted to preliminarily measure and tabulate correlations between a ratio of an extracted area to the reference area and ligation force, and on the basis of image data, express ligation force in units of force, such as newton.

The opening area evaluation part 56 detects and evaluates whether or not the suturing target opening W3 is opened due to defective suturing, or if it is opened, detects and evaluates an opening amount, and is configured to evaluate an opening area in the suture region of the simulated body W on the basis of the image data.

The suture time evaluation part 57 is one that evaluates a time from the start of suturing to the end of the suturing, and configured to make the evaluation on the basis of, for example, a simulator operating time recorded in the suture simulator 101.

The comprehensive evaluation part 58 first determines whether or not suturing performed on the simulated body W is allowable on the basis of the two evaluations by the leak pressure evaluation part 53 and the all layer suture evaluation part 54. The comprehensive evaluation part 58 is configured, for example, to make the comprehensive evaluation "GOOD" as illustrated in FIG. 9(a), in the case where suturing is neatly performed, a leak pressure is at a level causing no problem, and all the stitches accomplish the all-layer suture, and to make the comprehensive evaluation "BAD" as illustrated in FIG. 9(b), in the case where a suture state is not good, and a leak pressure is found non-negligibly.

Also, the comprehensive evaluation part 58 is configured not only to make the comprehensive evaluation but also to make a five-grade evaluation on each of the above-described evaluation items. Each of the evaluation items is evaluated on the basis of a value measured on a suture of the simulated body W formed by an expert.

The evaluation result display part 59 is one that displays the evaluations made by the comprehensive evaluation part 58 on the second monitor. More specifically, the evaluation result display part 59 is, as illustrated in FIG. 9(a) and FIG. 9(b), one that forms and displays, on a screen of the second monitor, an image display region R1 adapted to display image data taken by the suture evaluation camera 4; an evaluation chart display region R2 adapted to display a result of the five-grade evaluation on each of the evaluation items on an evaluation chart; a main evaluation display region R3 adapted to display a result indicating "GOOD" suturing or "BAD" suturing based on main evaluation items; and a reference evaluation display region R4 adapted to display reference evaluation items. In the main evaluation display region R3, the comprehensive evaluation determined by the leak pressure and the number of all-layer sutures is displayed. Further, the main evaluation display region R3 and the reference evaluation display region R4 display where a specific measured value of each of the evaluation items is on a linear graph, together with an allowable range (shaded region on the graph) that is set on the basis of a distribution of values measured on sutures of the simulated body W formed by experts. Accordingly, a user can recognize at a glance whether or not a value of each of the evaluation items is within an allowable range by seeing a corresponding linear graph.

The suture simulator system 200 configured as described can imitate suturing an intestinal canal by endoscopic surgery in the form close to actual surgery to give simulated experience of suturing an intestinal canal. Also, whether or not the simulated body W is sufficiently sutured can be immediately known by the suture technique evaluation apparatus 100.

More specifically, evaluation parameters difficult for a person to visually evaluate can be automatically evaluated objectively and accurately through a leak pressure test by the pressurizing mechanism 3 and image analysis of image data imaged by the suture evaluation camera 4.

Accordingly, a user can immediately understand a suture result, and also immediately learn a subtle suturing sense with reference to evaluation results.

Next, a suture simulator system 200 according to another embodiment of the present invention is described with reference to FIGS. 10 to 15.

Figure 10:
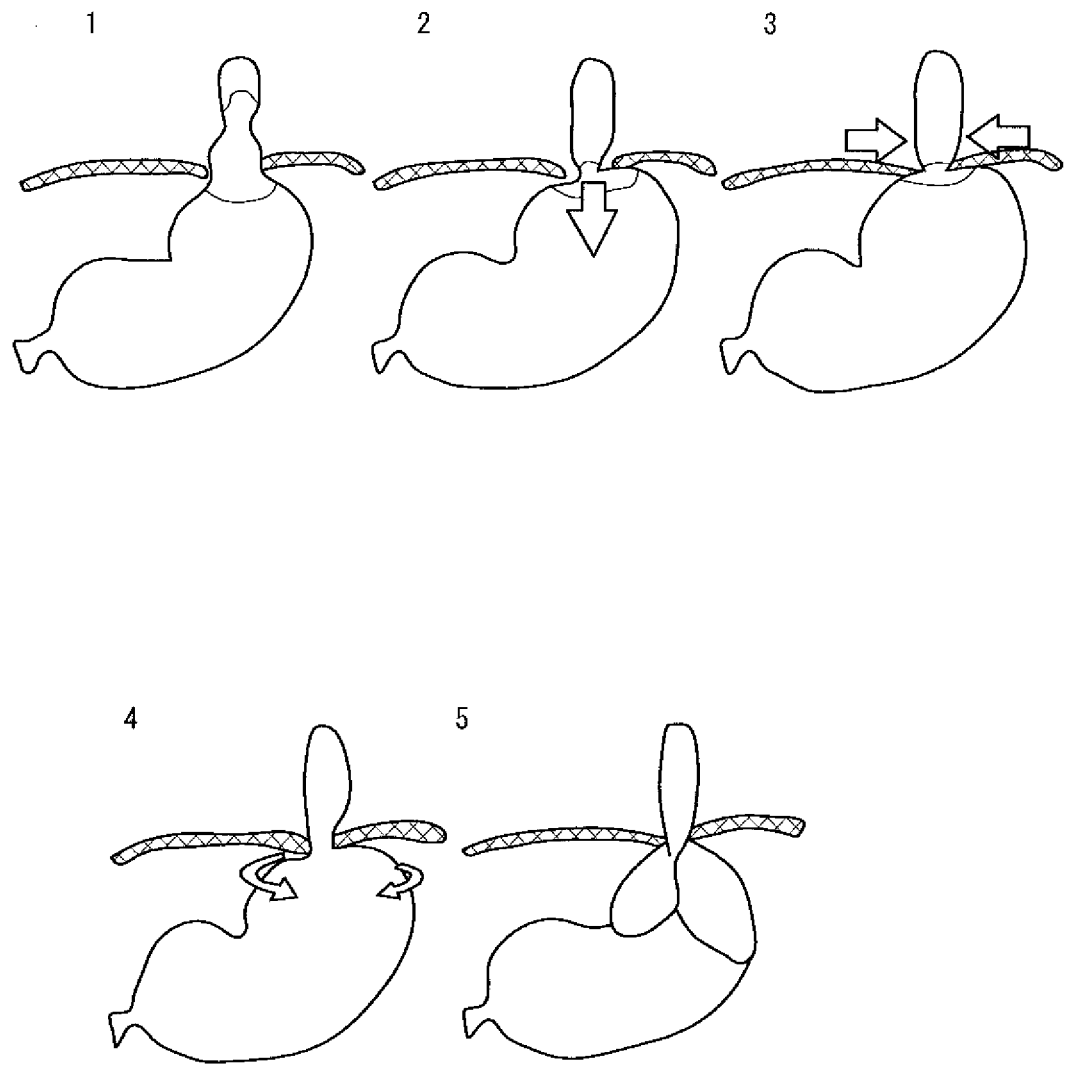
FIG. 10 is a schematic diagram illustrating a procedure of nissen fundoplication.

The suture simulator system 200 according to another embodiment is one intended to do training for nissen fundoplication by a laparoscope. Note that the nissen fundoplication is a surgery technique for a patient of reflux esophagitis as illustrated in FIG. 10.

Figure 11A:
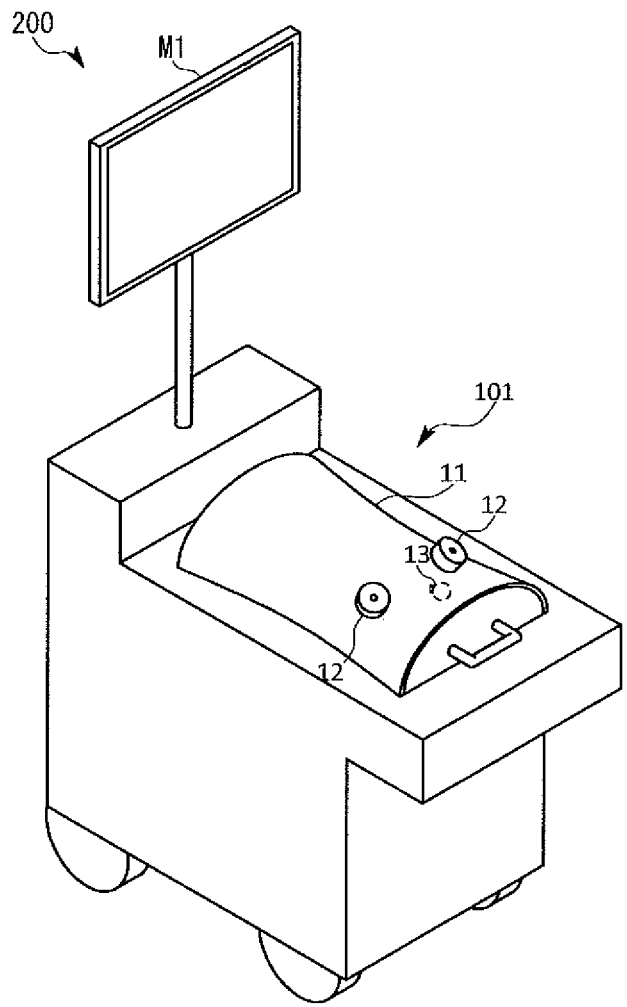
FIG. 11(a) is a schematic perspective view illustrating the appearance of a suture simulator system according to another embodiment of the present invention.
Figure 11B:
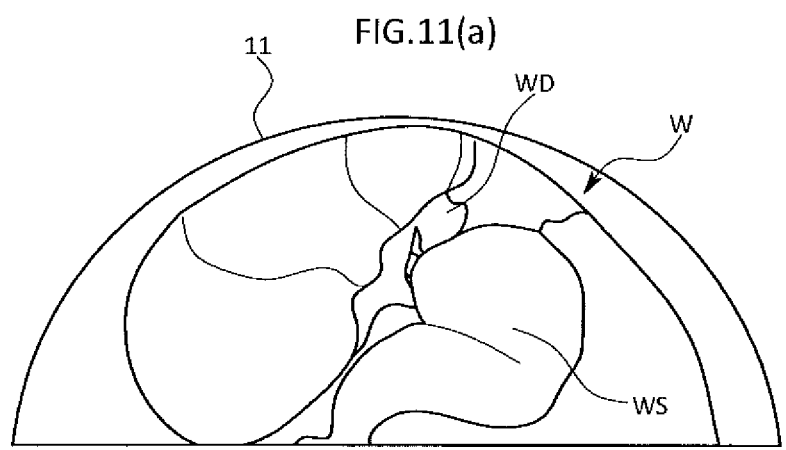
FIG. 11(b) is a schematic diagram illustrating an inner structure of a simulated torso in another embodiment.

As illustrated in FIG. 11(a) and FIG. 11(b), a suture simulator 101 according to another embodiment is one that has a simulated torso 11 which contains simulated body W: the simulated body W simulates at least diaphragm, stomach and liver. This simulated body W includes a simulated diaphragm WD that simulates the diaphragm and a simulated stomach WS that simulates the stomach: the simulated diaphragm WD and the simulated stomach WS are made of elastic resin. The simulated body W is provided in the simulated torso 11 in the state that an esophagus of the simulated stomach WS is inserted in the hole that is formed in the middle of the simulated diaphragm WD.

Figure 12A:
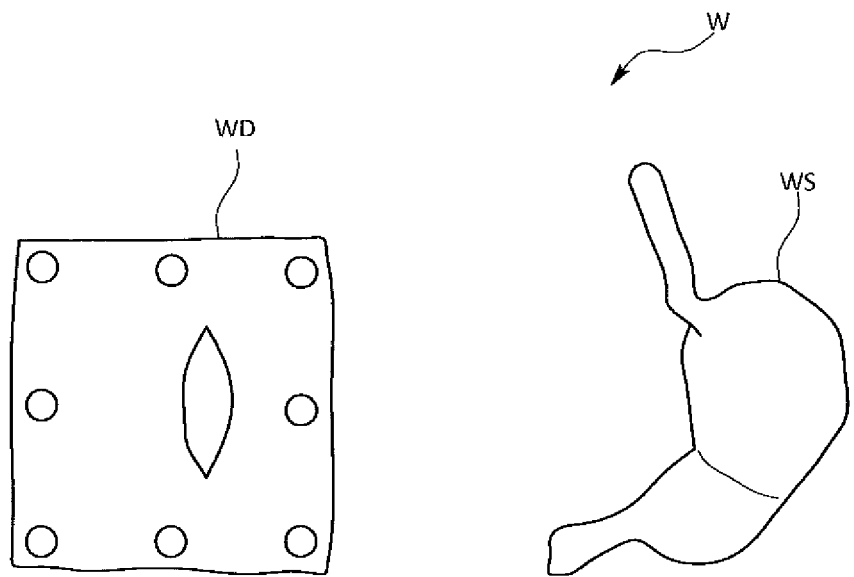
FIG. 12(a) is a schematic diagram illustrating the simulated body before suturing in another embodiment.
Figure 12B:
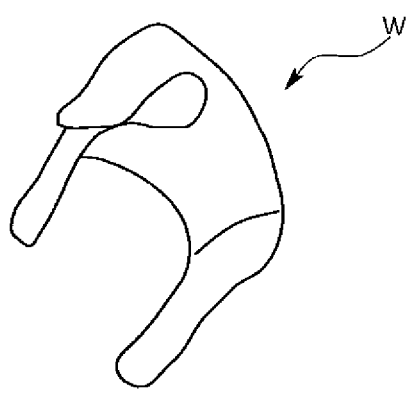
FIG. 12(b) is a schematic diagram illustrating the simulated body after suturing in another embodiment.

Then, a trainee for nissen fundoplication inserts forceps for the laparoscopic surgery from two forceps insertion parts 12 to the inside of the simulated torso 11. The trainee sutures the simulated body W following the procedure illustrated in FIG. 10 with seeing moving image of a technique imaging camera 13 displayed on a first monitor M1. Finally, the simulated body W becomes a shrunk state as illustrated in FIG. 12(b).

Figure 13:
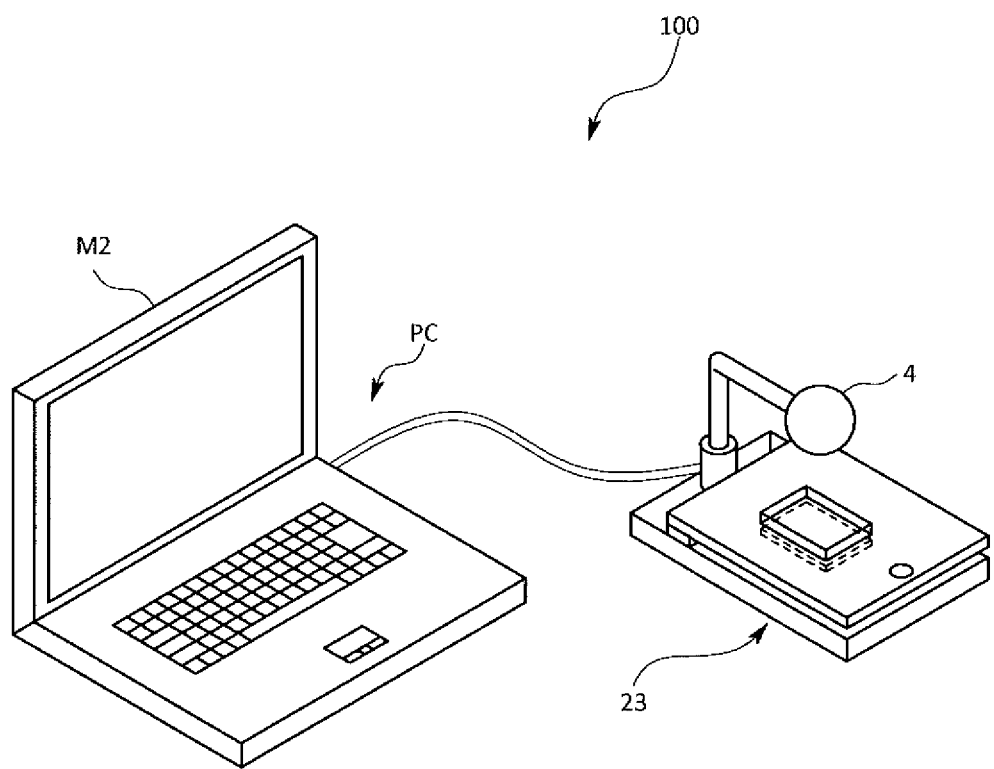
FIG. 13 is a schematic perspective view illustrating the suture technique evaluation apparatus in another embodiment.

The simulated body W that has been performed nissen fundoplication is removed from the suture simulator 101, and the simulated body W is used for the suture evaluation by a suture evaluation apparatus 100 that is provided another place from the suture simulator 101 as illustrated in FIG. 13.

The suture evaluation apparatus 100 has a suture evaluation mechanism E for a comprehensive evaluation of the suture state of the simulated body W that has been performed nissen fundoplication. Thus, the suture evaluation mechanism has a fixator 23, a suture evaluation camera 4 and a control mechanism 5.

The fixator 23 the simulated body W such that a cardia portion of the simulated body W that has been performed the nissen fundoplication faces to the suture evaluation camera 4.

The suture evaluation camera 4 is arranged to take images of opening of the fixator 23.

The control mechanism 5 is a computer system installed with a program for a function of a nissen fundoplication evaluation part: the nissen fundoplication evaluation part evaluates the state of suture of the simulated body W on a basis of image data taken by the suture evaluate camera 4. This nissen fundoplication evaluation part evaluates hiatus reefing (hereinafter Task 1) and cardioplasty (hereinafter Task 2) respectively. Evaluation criteria is time required for Task 1, time required for Task 2, completion ratio of all layer sutured of Task 1, completion ratio of all layer sutured of Task 2, area of opening of Task 1, suture uniformity of Task 1, suture uniformity of Task 2, moving distance of the forceps, and moving speed of the forceps.

Figure 14:
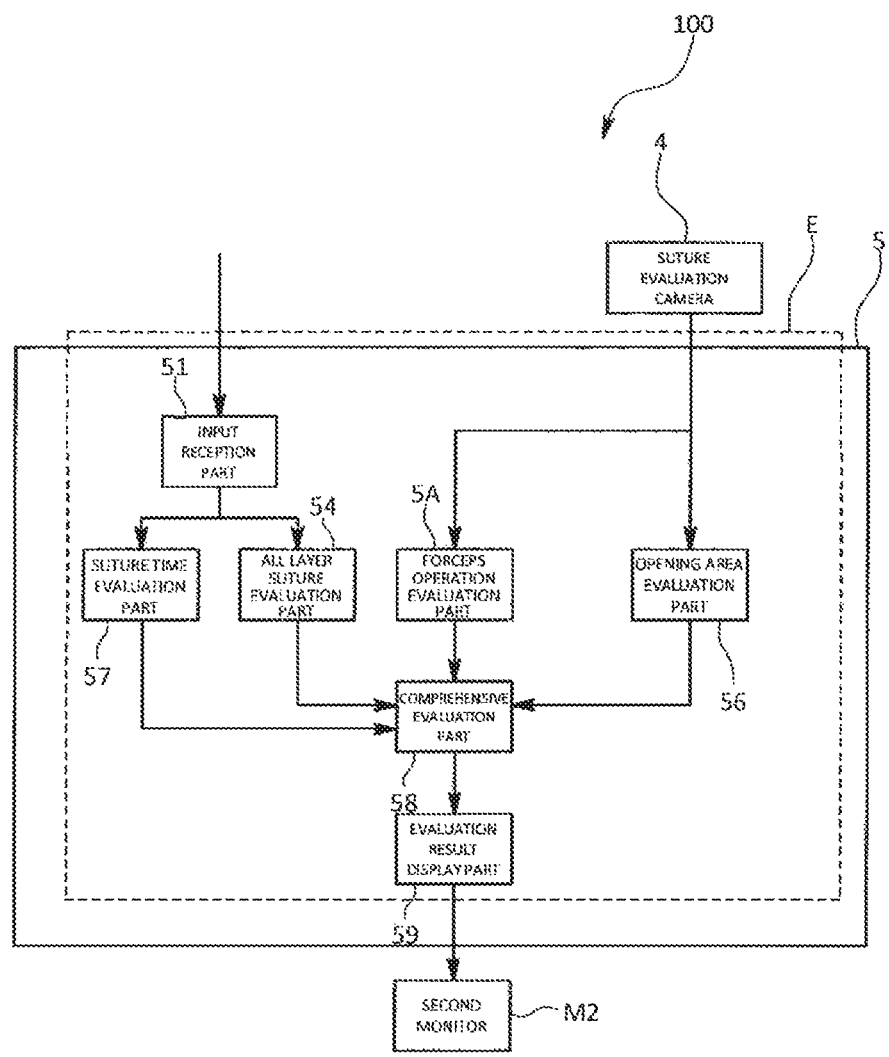
FIG. 14 is a schematic functional block diagram illustrating the configuration of the suture simulator system in another embodiment.

More specifically, the nissen fundoplication evaluation part is configured at least a input reception part 51, all layer suture evaluation part 54, opening area evaluation part 56, suture time evaluation part 57, forceps operation evaluation part 5A, comprehensive evaluation part 58 and evaluation result display part 59 as illustrated in FIG. 14.

The input reception part 51, the all layer suture evaluation part 54 and the suture time evaluation part 57 is almost same with the above mentioned embodiment, so detailed explanations of these parts are omitted.

Figure 15:
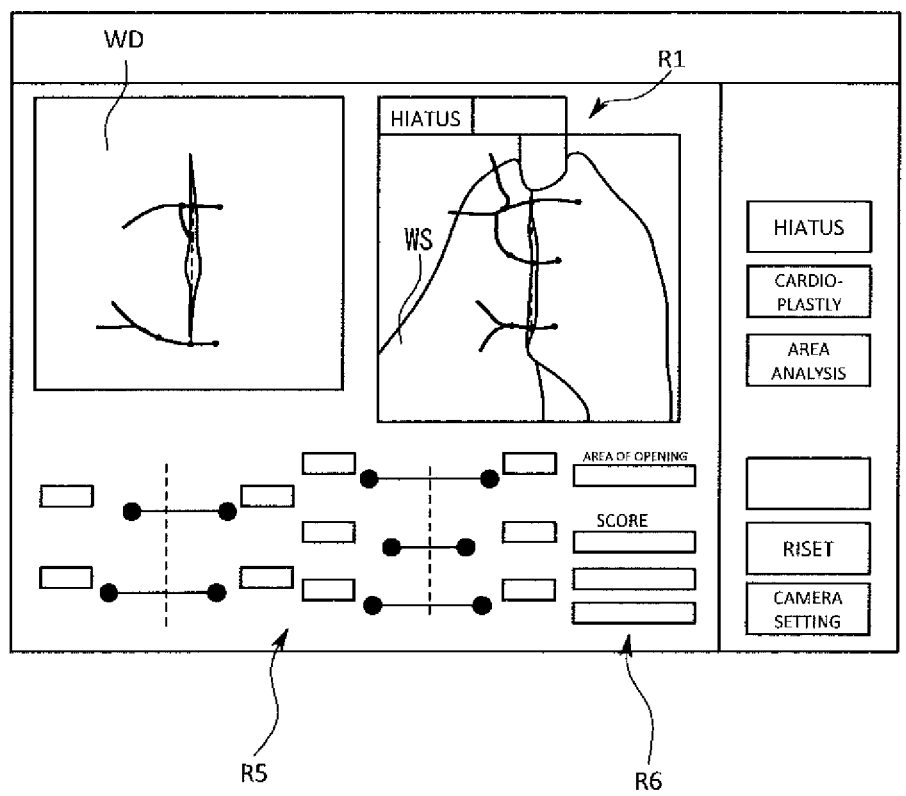
FIG. 15 is a schematic diagram illustrating examples of a suture evaluation result displayed on a second monitor in another embodiment.

The opening area evaluation part 56 is configured to calculate the opening area of hiatus in the simulated diaphragm WD on a basis of the image data taken by the suture evaluation camera 4 as illustrated in FIG. 15. In addition, the opening area evaluation part 56 may be configured to evaluate the a sutured portion area of the simulated stomach WS on the basis of the image data. The opening area can be evaluated based on the detection of the edge or the difference of color or brightness in the image data.

The forceps operation evaluation part 5A is configured to compare the required time for finishing the nissen fundoplication with a predetermined standard time: the required time is inputted by the user through the input reception part 51. The standard time is determined by mean of the required times of experts. In addition, the forceps operation evaluation part 5A may be configured to evaluate the moving distance or time of the forceps on the basis of moving image data taken by the technique imaging camera 13.

The comprehensive evaluation part 58 is configured to evaluate the trainee's nissen fundoplication level compared with the experts' level based on the each evaluation result of the all layer suture evaluation part 54, the opening area evaluation part 56, the suture time evaluation part 57, and the forceps operation evaluation part 5A.

As illustrated in FIG. 15, the evaluation result display part 59 displays the evaluation result on the second monitor M2 based on the output from the comprehensive evaluation part 58. A evaluation screen of FIG. 15 has some regions: an image display region R1 is adapted to display images of the sutured portion, an uniformity display region R5 is adapted to display a positional relation between the opening and sutured points and evaluation result of the suture uniformity, and evaluation value display region R6 is adapted to display the evaluation of each items by the value.

The suture simulator system 200 configured as described can objectively evaluate whether the nissen fundoplication by the trainee is good or not.

Other embodiments are described.

In the above-described embodiment, the comprehensive evaluation is based on the two evaluation items; however, all of the evaluation items may be synthesized to make the comprehensive evaluation. Alternatively, the comprehensive evaluation may be made by combining different evaluation items.

The simulated body simulates an intestinal canal; however, the simulated body may simulate, for example, a blood vessel, a ureter, skin, or the like. In short, the simulated body is only required to be one that simulates part of the human body. Also, the suture technique evaluation program may be one that is recorded on a storage medium such as a CD, DVD, flash memory, or HDD.

In the above-described embodiment, the ligation force and the opening area of the suturing target opening are evaluated on the basis of image data taken by the suture evaluation camera; however, the suture technique evaluation apparatus may be configured to, for example, use only the pressurizing mechanism to evaluate a leak pressure. Also, in order to evaluate the leak pressure, the evaluation is made on the basis of the pressure inside the pressurizing chamber; however, a pressure itself of gas leaking from the suturing target opening may be directly measured and used for the evaluation.

Besides, the various embodiments may be modified or combined unless contrary to the scope of the present invention.

REFERENCE SIGNS LIST

200: Suture simulator system
101: Suture simulator
11: Simulated body
12: Forceps insertion port
13: Technique imaging camera
14: Placing stage
15: Fixing mechanism
100: Suture technique evaluation apparatus
21: Lid body
22: Housing
3: Pressurizing mechanism
31: Pressurizing source
32: Pressurizing chamber
33: Transparent wall
34: Attachment port
4: Suture evaluation camera
5: Control mechanism
51: Input reception part
52: Control part
53: Leak pressure evaluation part
54: All layer suture evaluation part
55: Ligation force evaluation part
551: Suture region extraction part
552: Ligation force calculation part
56: Opening area evaluation part
57: Suture time evaluation part
58: Comprehensive evaluation part
59: Evaluation result display part
M1: First monitor
M2: Second monitor
P: Pressure sensor
W: Simulated body

The invention claimed is:

1. A suture technique evaluation apparatus that evaluates a suture technique performed on a simulated body simulating a part of a human body and including a plurality of layers, the suture technique evaluation apparatus comprising:
a pressurizing mechanism that pressurizes at least a suture region of the simulated body with gas, the pressurizing mechanism including:
   a pressurizing source, and
   a pressurizing chamber that is communicatively connected to the pressurizing source and has an attachment port to be attached with the simulated body;
a pressure sensor that is provided so as to measure a pressure inside the pressurizing chamber; and
a control mechanism including a processor configured to:
evaluate a value related to a leak pressure from the suture region on a basis of the pressure measured with the pressure sensor,
evaluate a user input indicating a number of suture threads that penetrate through all the layers compared to a user input indicating a number of stitches actually made, and
output a comprehensive evaluation result of the suture technique on a basis of a result of the evaluation of the leak pressure and a result of the evaluation of the user input indicating the number of suture threads that penetrate through all the layers compared to the user input indicating the number of stitches actually made.

2. The suture technique evaluation apparatus according to claim 1, further comprising:
a camera configured to image at least the suture region where suturing is performed on the simulated body; and
wherein the processor is further configured to
evaluate ligation force of the suturing on a basis of image data taken by the camera.

3. The suture technique evaluation apparatus according to claim 2, wherein the processor is further configured to:
extract the suture region from the image data; and
calculate a value related to the ligation force on a basis of an area of the suture region extracted from the image data and a predetermined reference area.

4. The suture technique evaluation apparatus according to claim 3, wherein:
the simulated body is formed in a sheet shape and comprises a suturing target opening to be sutured, and a surrounding region of the suturing target opening and an outside region on an outer side of the surrounding region are respectively colored in different colors; and
the processor is further configured to extract the surrounding region as the suture region on a basis of a difference in color or brightness between the surrounding region and the outside region in the image data.

5. The suture technique evaluation apparatus according to claim 1, wherein:
a part of a partition wall forming the pressurizing chamber is formed of a transparent wall; and
a camera is configured to image the suture region of the simulated body that is attached on the attachment port through the transparent wall from outside the pressurizing chamber.

6. The suture technique evaluation apparatus according to claim 1, wherein the processor is further configured to:
evaluate an opening area in the suture region of the simulated body on a basis of image data, and
evaluate a time required for suturing; and
wherein the processor determines whether the suture technique meets a predetermined standard on a basis of only the evaluations of the leak pressure and the user input indicating the number of suture threads that penetrate through all the layers compared to the user input indicating the number of stitches actually made.

7. The suture technique evaluation apparatus according to claim 1, wherein
the simulated body simulates a diaphragm and a stomach, and the processor is further configured to
evaluate at least a size of hiatus in the simulated body on the basis of image data.

8. A suture simulator system comprising:
the suture technique evaluation apparatus according to claim 1; and
a suture simulator that can simulate the suture technique.

9. A non-transitory computer readable medium that stores a suture technique evaluation apparatus program used for a suture technique evaluation apparatus that is adapted to evaluate a suture technique performed on a simulated body including a plurality of layers, wherein the suture technique evaluation apparatus comprises a pressurizing mechanism that pressurizes at least a suture region of the simulated body with gas, the pressurizing mechanism including a pressurizing source and a pressurizing chamber that is communicatively connected to the pressurizing source and has an attachment port to be attached with the simulated body, and a pressure sensor that is provided so as to measure a pressure inside the pressurizing chamber, wherein a suture technique evaluation program, when executed by a processor of a computing device, is configured to cause the computing device to perform steps comprising:

evaluate a value related to a leak pressure from the suture region on a basis of the pressure measured with the pressure sensor;

evaluate a user input indicating a number of suture threads that penetrate through all the layers compared to a user input indicating a number of stitches actually made; and output a comprehensive evaluation result of the suture technique on a basis of a result of the evaluation of the value related to the leak pressure and a result of the evaluation of the user input indicating the number of suture threads that penetrate through all the layers compared to the user input indicating the number of stiches actually made.

* * * * *